(12) United States Patent
Fan et al.

(10) Patent No.: US 11,787,009 B2
(45) Date of Patent: Oct. 17, 2023

(54) ELECTRIC TOOL

(71) Applicant: Nanjing Chervon Industry Co., Ltd., Nanjing (CN)

(72) Inventors: Yanfeng Fan, Nanjing (CN); Haijing Wang, Nanjing (CN); Baoshan Li, Nanjing (CN); Guoming Tong, Nanjing (CN); Tao Tao, Nanjing (CN); Xiang Zhao, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 1377 days.

(21) Appl. No.: 16/127,345

(22) Filed: Sep. 11, 2018

(65) Prior Publication Data

US 2019/0152018 A1 May 23, 2019

(30) Foreign Application Priority Data

Nov. 23, 2017 (CN) .......................... 201711183105.5

(51) Int. Cl.
| | |
|---|---|
| *B24B 47/12* | (2006.01) |
| *H02K 7/14* | (2006.01) |
| *H02K 1/10* | (2006.01) |
| *B24B 7/02* | (2006.01) |
| *B25F 5/00* | (2006.01) |
| *H02K 7/116* | (2006.01) |
| *H02K 7/06* | (2006.01) |
| *H02K 5/10* | (2006.01) |
| *B24B 23/02* | (2006.01) |
| *H02K 9/06* | (2006.01) |

(52) U.S. Cl.
CPC ............ *B24B 47/12* (2013.01); *B24B 23/028* (2013.01); *B25F 5/008* (2013.01); *H02K 5/10* (2013.01); *H02K 7/145* (2013.01); *H02K 7/1163* (2013.01); *H02K 9/06* (2013.01)

(58) Field of Classification Search
CPC .. B24B 1/00; H02K 7/145; B25F 5/02; A61B 2017/2925; A61B 2090/0813
See application file for complete search history.

(56) References Cited

U.S. PATENT DOCUMENTS

2022/0134530 A1* 5/2022 Kelleher .................. H02K 5/10
173/46

* cited by examiner

*Primary Examiner* — Daniel Jeremy Leeds
(74) *Attorney, Agent, or Firm* — Greenberg Traurig, LLP

(57) ABSTRACT

An electric tool includes an output member, a motor, and a housing. The motor includes a rotor shaft, a rotor core, and a stator component. The rotor shaft is configured to rotate around a first axis. The stator component includes a coil winding. The stator component surrounds the first axis to separate the accommodation cavity into a first space and a second space. The first space includes a first end and a second end. The motor further includes a first end cover and a second end cover. The first end cover is disposed at the first end of the first space. The second end cover is disposed at the second end of the first space. A passage is formed between the second end cover and a structure surrounding the first space, and the passage is configured to place the first space into communication with the second space.

16 Claims, 15 Drawing Sheets

ELECTRIC TOOL

RELATED APPLICATION INFORMATION

This application claims the benefit under 35 U.S.C. § 119(a) of Chinese Patent Application No. CN 201711183105.5, filed on Nov. 23, 2017, which is incorporated herein by reference in its entirety.

TECHNICAL FIELD

The following generally relates to an electric tool, and specifically, to a motor in the electric tool.

BACKGROUND

An electric tool such as an angle grinder, an electric drill, or a reciprocating saw generally includes a motor and a fan connected to a motor shaft. When the fan rotates, a heat dissipation airflow flowing through the motor is generated to dissipate heat for the motor. However, the heat dissipation airflow has much dust. If the dust enters the motor shaft and a rotor core, a heat dissipation effect for the motor is easily affected. Especially, dust generated by the angle grinder and metal cutting tools is metal dust, and if the metal dust is adsorbed on the rotor core with the heat dissipation airflow, an air gap between the rotor core and a stator core is easily blocked, to cause a failure of the motor.

SUMMARY

In one aspect of the disclosure, an electric tool includes an output member, a motor, and a housing. The output member is used to output power. The motor is used to drive the output member to move to output power. The housing provides an accommodation cavity used to accommodate the motor. The motor includes a rotor shaft, a rotor core, and a stator component. The rotor shaft is configured to rotate around a first axis. The rotor core synchronously rotates with the rotor shaft. The stator component includes a coil winding. The stator component surrounds the first axis to separate the accommodation cavity into a first space and a second space. The rotor core is disposed in the first space. The coil winding is disposed in the second space. Along a direction of the first axis, the first space includes a first end away from the output member and a second end close to the output member. The motor further includes a first end cover and a second end cover. The first end cover is disposed at the first end of the first space, to seal the first space at the first end of the first space. The second end cover is disposed at the second end of the first space. A passage is formed between the second end cover and a structure surrounding the first space, and the passage is configured to communicate the first space and the second space.

Further, the second end cover may rotate with the rotor shaft.

Further, the electric tool may include a fan fixedly connected to the rotor shaft. When the fan rotates, barometric pressure in the first space is less than barometric pressure in the second space.

Further, the passage may include a narrowest passage portion. The narrowest passage portion has a smallest sectional area in a plane perpendicular to an extension direction of the passage. The first space extends along the direction of the first axis. A sectional area of the narrowest passage portion is less than a largest sectional area of the first space in a plane perpendicular to the first axis.

Further, the stator component may include a stator core and an insulation frame. The stator core may include a yoke portion and multiple tooth portions extending from the yoke portion. The insulation frame may be at least partially disposed between the stator core and the coil winding. The insulation frame may include a front end portion close to the output member and a rear end portion away from the output member, and the first end cover may be connected to the rear end portion of the insulation frame.

Further, the insulation frame may include multiple enclosure portions that are spaced apart in a circumferential direction around the first axis. The enclosure portions form an opening used to make the tooth portion exposed. The motor may include a spacer disposed between two adjacent enclosure portions.

Further, the passage may be formed between the second end cover and an end surface of the front end portion.

Further, the second end cover may be fixedly connected to the rotor shaft.

Further, a section of the passage in a plane passing through the first axis may include a first section line and a second section line. A distance between two points that are closest to each other in the first section line and the second section line is preferred to be less than or equal to 5 mm.

Further, the electric tool may include a fan fixedly connected to the rotor shaft. The second end cover may be fixedly connected to the fan.

Further, the electric tool may include a fan fixedly connected to the rotor shaft. The fan may be made of aluminium.

Further, the electric tool may include an air director including an annular portion around the first axis. A space enclosed by the annular portion may form, with the first space, an annular space sealed relative to the second space in a radial direction perpendicular to the first axis. The passage may be formed between the second end cover and an end surface of the annular portion.

Further, an annular groove may be formed on the second end cover, the annular portion may be embedded into the annular groove, and there may be a gap between the annular portion and a groove wall of the annular groove.

Further, the passage may include a first passage portion and a second passage portion. The first passage portion may extend along a first line direction. The second passage portion may extend along a second line direction. The first line direction may intersect with the second line direction.

Further, the second end cover may be connected to a magnetic member.

Further, the first end cover may be made of a rubber material.

In another aspect of the disclosure, an angle grinder includes an output shaft used to install an abrasive disc, a motor used to drive the output shaft to rotate, and a housing provided with an accommodation cavity used to accommodate the motor. The motor includes a rotor shaft configured to rotate around a first axis, a rotor core synchronously rotating with the rotor shaft, and a stator component including a coil winding. The stator component surrounds the first axis to separate the accommodation cavity into a first space and a second space. The rotor core is disposed in the first space. The coil winding is disposed in the second space. Along a direction of the first axis, the first space includes a first end away from the output member and a second end close to the output member. The motor further includes a first end cover disposed at the first end of the first space, to seal the first space at the first end of the first space, and a second end cover disposed at the second end of the first space. A passage is formed between the second end cover and a structure surrounding the first space, and the passage is configured to communicate the first space and the second space.

Further, the angle grinder may include a fan fixedly connected to the rotor shaft. When the fan rotates, barometric pressure in the first space is less than barometric pressure in the second space. The second end cover rotates with the rotor shaft.

Further, the angle grinder may include an air director, including an annular portion around the first axis. A space enclosed by the annular portion may form, with the first space, an annular space sealed relative to the second space in a radial direction perpendicular to the first axis. The passage may be formed between the second end cover and an end surface of the annular portion. An annular groove may be formed on the second end cover, the annular portion may be embedded into the annular groove, and there may be a gap between the annular portion and a groove wall of the annular groove.

In another aspect of the disclosure, a sander includes a baseboard used to install sandpaper, a motor used to drive the baseboard to move, and a housing providing an accommodation cavity used to accommodate the motor. The motor includes a rotor shaft configured to rotate around a first axis, a rotor core synchronously rotating with the rotor shaft, and a stator component including a coil winding. The stator component surrounds the first axis to separate the accommodation cavity into a first space and a second space. The rotor core is disposed in the first space. The coil winding is disposed in the second space. Along a direction of the first axis, the first space includes a first end away from the output member and a second end close to the output member. The motor further includes a first end cover disposed at the first end of the first space, to seal the first space at the first end of the first space, and a second end cover disposed at the second end of the first space. A passage is formed between the second end cover and a structure surrounding the first space, and the passage is configured to communicate the first space and the second space.

The electric tool achieves a good dustproof effect.

DETAILED DESCRIPTION

Figure 1:
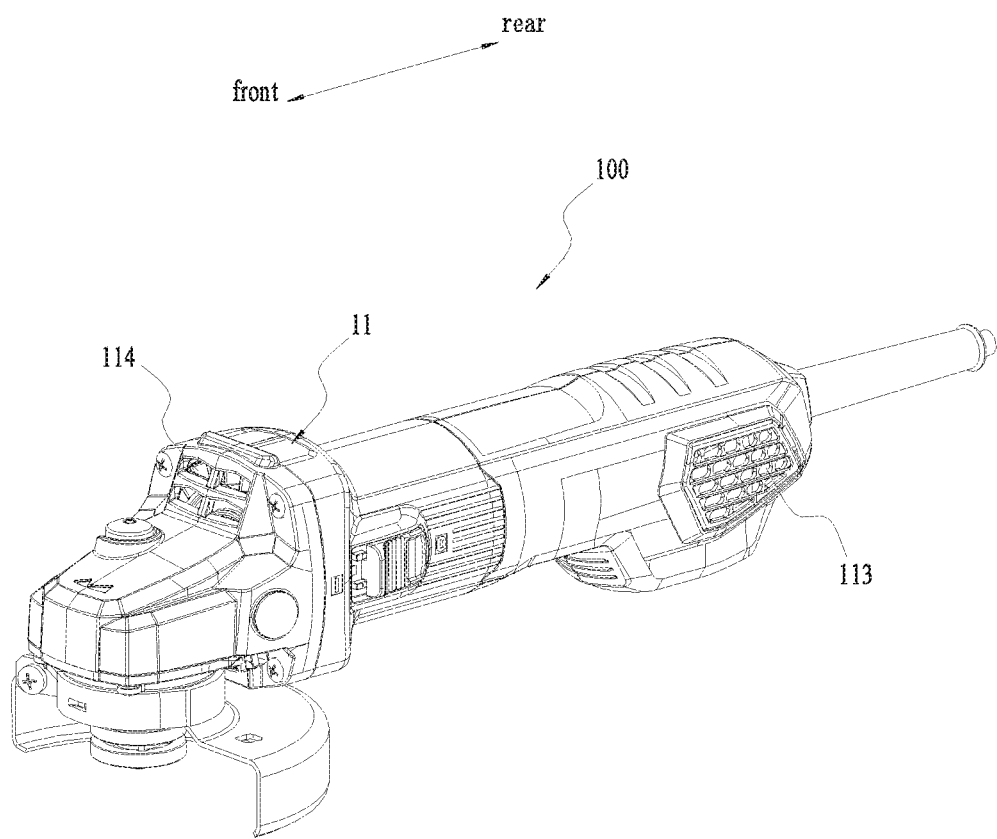
FIG. 1 is a three-dimensional diagram of an example electric tool constructed according to the description that follows.
Figure 2:
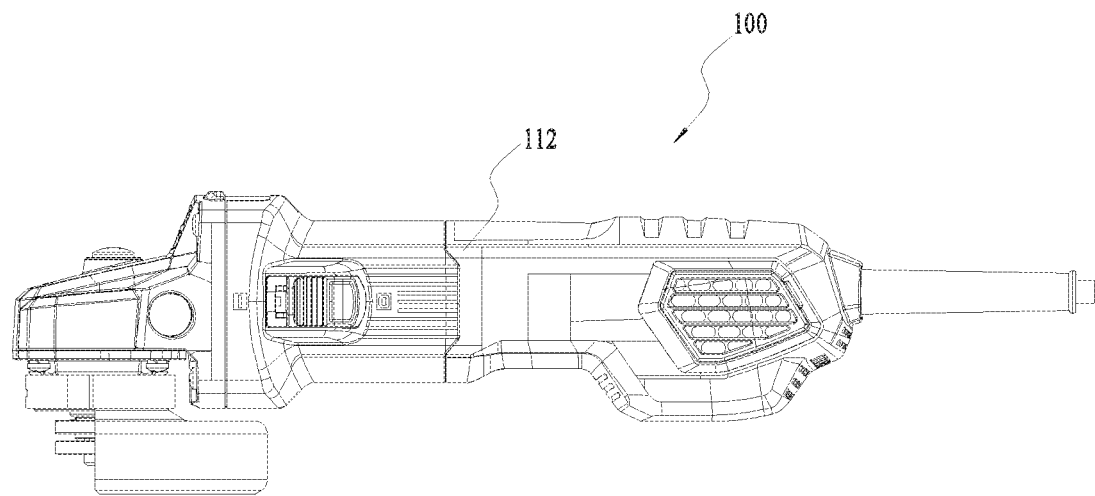
FIG. 2 is a plan view of the electric tool in FIG. 1.
Figure 3:
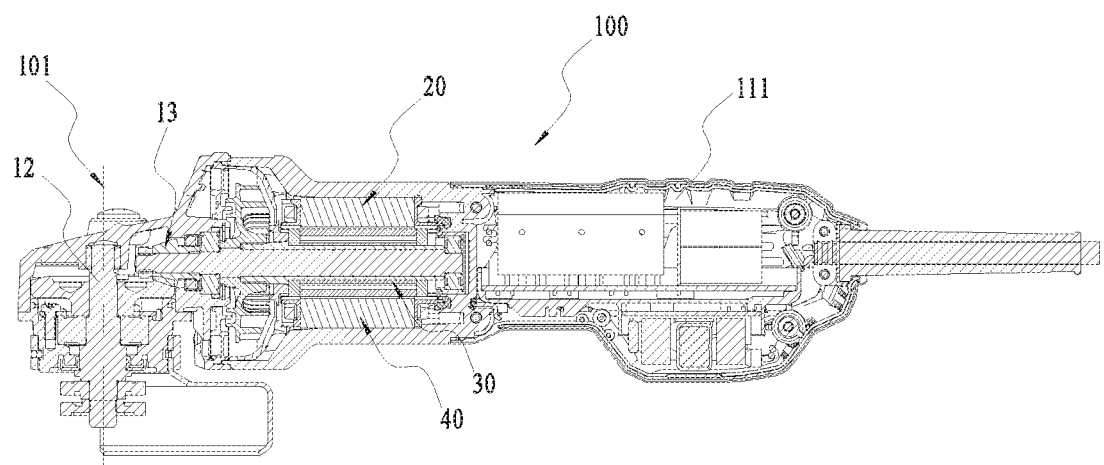
FIG. 3 is a sectional view of the electric tool in FIG. 2.
Figure 4:
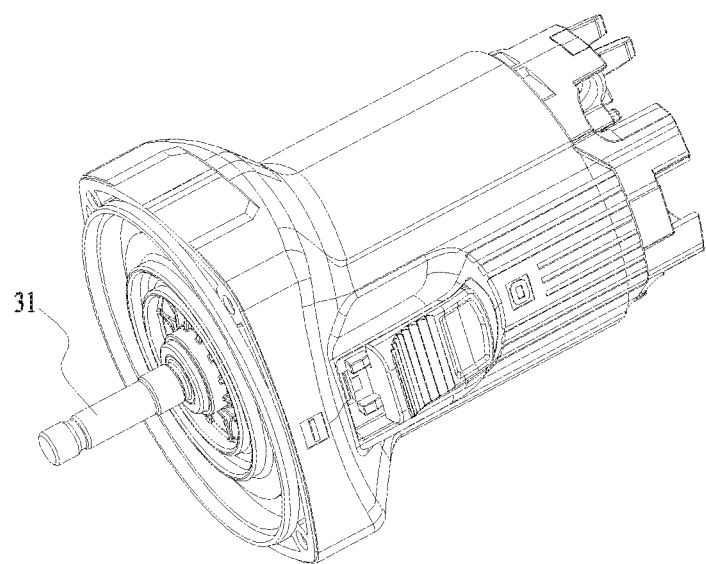
FIG. 4 is a three-dimensional diagram of a partial housing, a motor, a fan, and an air director of the electric tool in FIG. 3.
Figure 5:
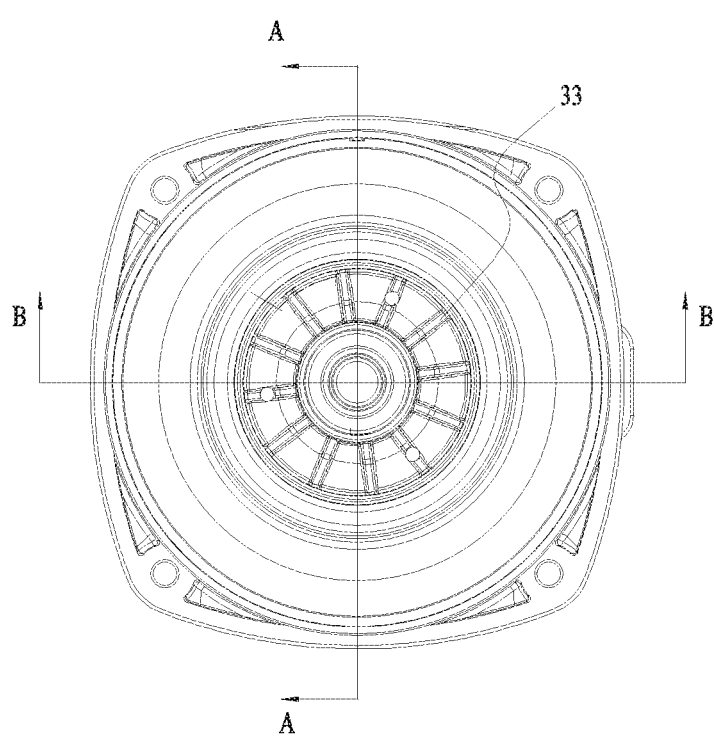
FIG. 5 is a left view of a structure shown in FIG. 4.
Figure 6:
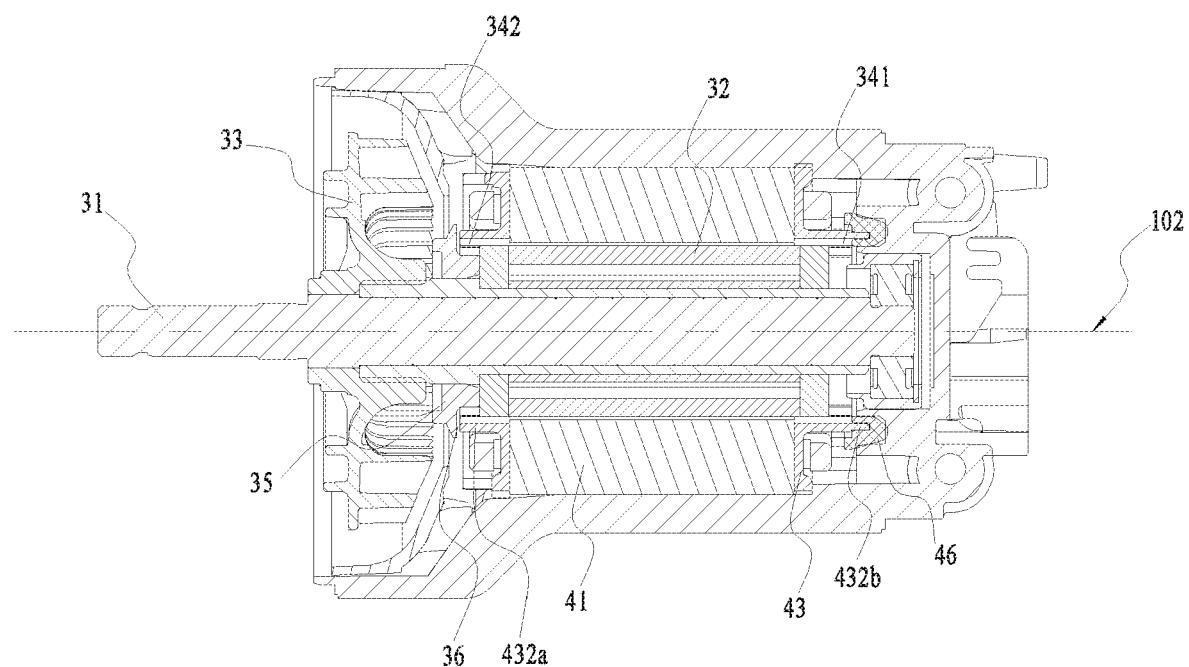
FIG. 6 is a sectional view of a structure shown in FIG. 5 along an A-A line.
Figure 7:
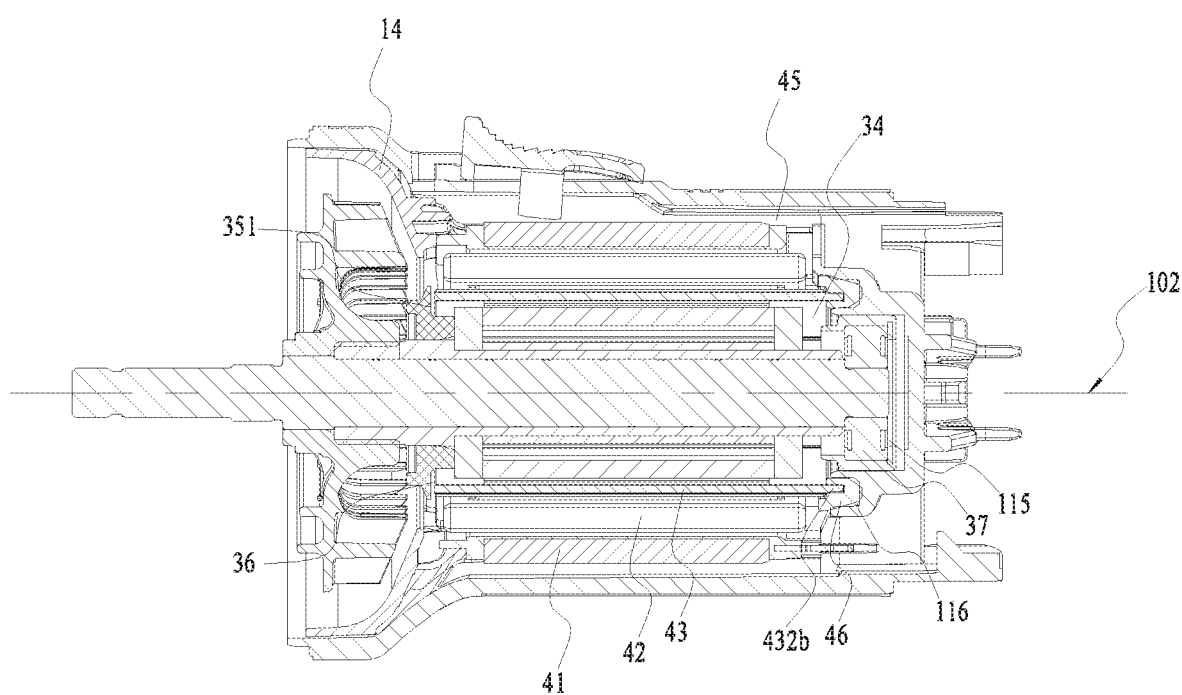
FIG. 7 is a sectional view of a structure shown in FIG. 5 along a B-B line.
Figure 8:
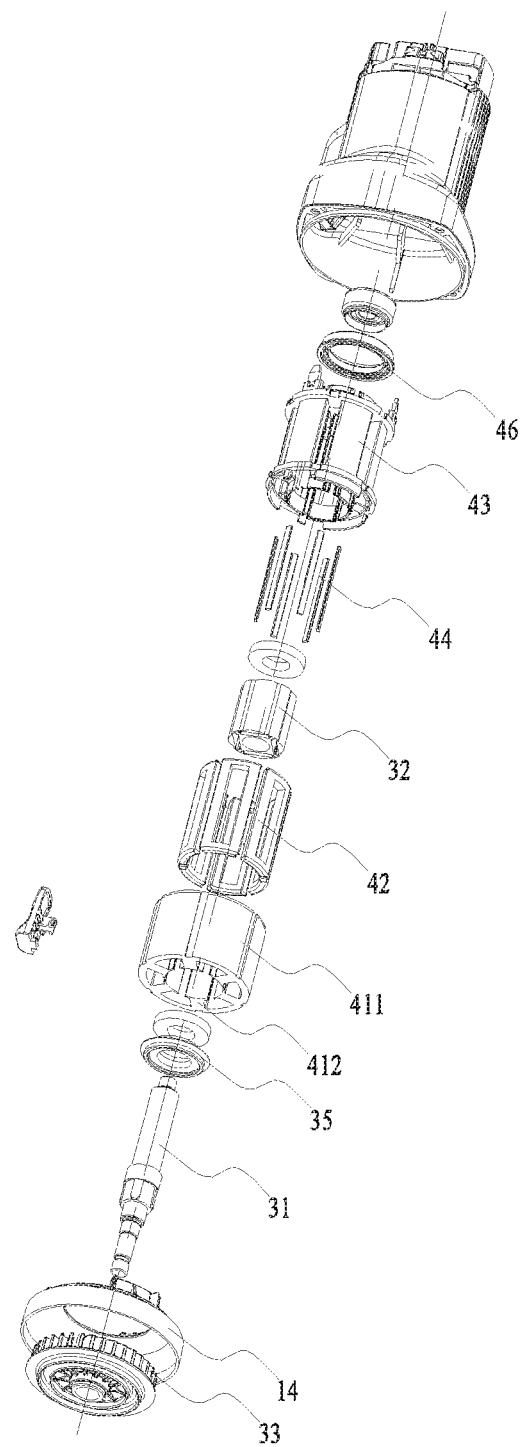
FIG. 8 is an exploded view of a structure shown in FIG. 5.
Figure 9:
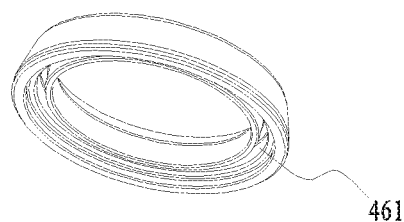
FIG. 9 is a three-dimensional diagram of a first end cover shown in FIG. 7.
Figure 10:
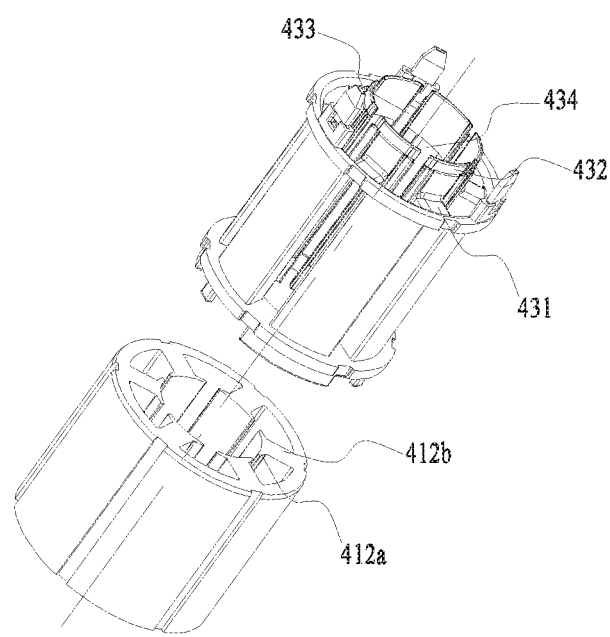
FIG. 10 is a three-dimensional diagram of a stator core and an insulation frame shown in FIG. 7.

An example electric tool 100 is shown in FIG. 1 to FIG. 3 and is specifically an angle grinder. The electric tool 100 includes a housing 11, a motor 20, an output member 12, and a transmission device 13.

It may be understood that, the electric tool 100 need not be limited to the illustrated angle grinder, and in fact, any electric tool including a motor 20 that operates in a similar manner to that which is described herein is intended to fall within the protection scope of the claims presented. For example, the electric tool 100 may also be a drilling tool such as an electric drill or a screwdriver, or may also be a grinding tool such as a sander or a polisher, or may also be a cutting tool such as an electric circular saw or a versatile tool, or may also be a reciprocating tool such as a reciprocating saw or a ribbon saw.

Referring to FIG. 1 to FIG. 3, an accommodation cavity 111 is formed by the housing 11. The motor 20 and the transmission device 13 are both disposed in the accommodation cavity 111. A handle portion 112 for a user to hold is further formed on the housing 11. For the angle grinder, the output member 12 is specifically an output shaft. The output shaft is capable of rotating by using an output axial line 101 as an axis, and the output shaft may be used to install an abrasive disc. The transmission device 13 is disposed between the motor 20 and the output shaft, to transmit power between the motor 20 and the output shaft. To dissipate heat for the motor 20 and other parts in the accommodation cavity 111, an air inlet 113 and an air outlet 114 are further formed on the housing 11, and the motor 20 is disposed between the air inlet 113 and the air outlet 114. When the electric tool is a sander, the output member may be a baseboard, and the output member is used to install sandpaper, to implement a grinding function.

For ease of description of the technical solution presented herein, a side of the output member 12 opposite to the motor 20 is defined as a front side, and a side of the motor 20 opposite to the output member 12 is defined as a rear side.

Referring to FIG. 3 to FIG. 11, the motor 20 includes a rotor component 30 and a stator component 40. The rotor component 30 includes a rotor shaft 31 and a rotor core 32. The rotor shaft 31 is capable of rotating relative to the housing 11 by using a first axis 102 as an axis. The rotor core 32 is fixedly installed in the rotor shaft 31 to rotate with the rotor shaft 31. The first axis 102 for rotation of the rotor shaft 31 is further perpendicular to the output axial line 101 for rotation of the output member 12 in this example. The rotor shaft 31 is further fixedly connected to a fan 33. The fan 33 is disposed at a front side of the motor 20. In this way, when the fan 33 rotates, a heat dissipation airflow that flows into the accommodation cavity 111 from the air inlet 113 and then flows out of the air outlet 114 can be generated. The heat dissipation airflow further flows through the motor 20, to dissipate heat for the motor 20.

The stator component 40 includes a stator core 41, a coil winding 42, and an insulation frame 43. The stator core 41 includes a yoke portion 411 and tooth portions 412. The yoke portion 411 is disposed around the first axis 102. The tooth portion 412 extends inwards from the yoke portion 411 along a radial direction perpendicular to the first axis 102. The coil winding 42 is wound around the stator core 41. To ensure mutual insulation between the stator core 41 and the coil winding 42, the insulation frame 43 is at least partially disposed between the stator core 41 and the coil winding 42. Specifically, the insulation frame 43 covers at least a part of the stator core 41, to ensure mutual insulation between the stator core 41 and the coil winding 42.

Specifically, the tooth portion 412 includes a protruding portion 412a and a connection portion 412b. The protruding portions 412a are successively spaced apart in a circumferential direction of the first axis 102. The connection portion 412b is connected to the protruding portion 412a and the yoke portion 411.

The insulation frame 43 includes sleeving portions 431 and enclosure portions 432. Quantities of sleeving portions 431 and enclosure portions 432 are the same as a quantity of tooth portions 412. The sleeving portion 431 is used to sleeve the connection portion 412b, to ensure mutual insulation between the tooth portion 412 and the coil winding 42. The enclosure portion 432 and the protruding portion 412a are disposed in a same circumferential direction. The enclosure portions 432 are also successively arranged at intervals in the circumferential direction. The motor 20 further includes multiple spacers 44 that are successively disposed in the circumferential direction. The spacer 44 is further located in a gap 433 between two adjacent enclosure portions 432 in the circumferential direction. The enclosure portions 432 further form an opening 434 used to make the tooth portion 412 exposed. In this way, the protruding portion 412a, the enclosure portions 432, and the spacer separate the accommodation cavity 111 into a first space 34 and a second space 45 around the first axis 102. The first space 34 is formed around the first axis 102. The first space 34 is sealed in the radial direction perpendicular to the first axis 102. The rotor core 32 is disposed in the first space 34. The rotor shaft 31 penetrates through the first space 34. The coil winding 42 and the stator core 41 are disposed in the second space 45. The first space 34 extends along a direction of the first axis 102. The first space 34 includes a first end 341 and a second end 342 along the direction of the first axis 102. The first end 341 is further away from the output member 12 than the second end 342, and the second end 342 is closer to the output member 12 than the first end 341. The first end 341 is closer to the air inlet 113 than the second end 342, and the second end 342 is closer to the air outlet 114 than the first end 341.

The motor 20 further includes a first end cover 46 disposed at the first end 341 of the first space 34 and a second end cover 35 disposed at the second end 342 of the first space 34. The first end cover 46 seals the first space 34 at the first end 341 of the first space 34. A passage 36 is formed between the second end cover 35 and a structure surrounding the first space 34. The passage 36 allows the first space 34 to be in communication with the second space 45. The passage 36 is further a gap passage. In this way, the stator core 41, the insulation frame 43, the first end cover 46, and the second end cover 35 enclose and form the first space 34. The first space 34 can be in communication with the second space 45 by using only the passage 36. Therefore, when the fan 33 rotates, a heat dissipation airflow that flows into the accommodation cavity 111 is generated at the air inlet 113. When the heat dissipation airflow flows through a rear end of the motor 20 in the second space 45, because the first end 341 of the first space 34 is sealed by the first end cover 46, the heat dissipation airflow cannot flow into the first space 34 from the first end 341 of the first space 34. When the heat dissipation airflow flows through a front end of the motor 20, the second end cover 35 is disposed at the second end 342 of the first space 34 to form a passage 36 at the second end 342, the passage 36 is narrow relative to both the first space 34 and the second space 45, and barometric pressure in the first space 34 is lower than barometric pressure in the second space 45. In this way, after the heat dissipation airflow flows through the passage 36 and then enters the first space 34, an eddy is formed at the second end 342 of the first space 34 close to the passage 36. The eddy can spin off dust in the heat dissipation airflow to the second space 45, and the eddy can further prevent the heat dissipation airflow from further flowing into the first space 34, thereby achieving a very good dustproof effect.

More specifically, in a direction parallel to the first axis 102, the insulation frame 43 includes a front end portion 432a close to the output member 12 and a rear end portion 432b away from an output member 12. The front end portion 432a may specifically be an end of the enclosure portion 432 close to the output member 12, and the rear end portion 432b is specifically the other end of the enclosure portion 432 away from the output member 12. That is, a front end of the enclosure portion 432 is the front end portion 432a, and a rear end of the enclosure portion 432 is the rear end portion 432b. The front end portion 432a corresponds to the second end 342 of the first space 34, and the front end portion 432a is closer to the output member 12 than the rear end portion 432b. The rear end portion 432b corresponds to the first end 341 of the first space 34, and the rear end portion 432b is further away from the output member 12 than the front end portion 432a. In this example, the sleeving portion 431 and the enclosure portion 432 are integrally molded. Certainly, it may be understood that, in another example, an insulated sleeve may be formed by two parts: a front insulated sleeve portion and a rear insulated sleeve portion, and they may be interconnected, or may be connected by using a connection member.

A recess 115 in communication with the first space 34 is formed at a rear end of the housing 11 close to the motor 20. A rear bearing 37, used to support the rotor shaft 31, may be disposed in the recess 115. A first annular groove 116 around the recess 115 is further formed on the housing 11. The first annular groove 116 uses the first axis 102 as a center, and an opening of the first annular groove 116 faces the insulation frame 43. The first end cover 46 is disposed in the first annular groove 116, and the first end cover 46 is in close contact with the first annular groove 116. A second annular groove 461 is further formed on the first end cover 46. The rear end portion 432b of the insulation frame 43 is embedded into the second annular groove 461 and is in close contact with a groove wall of the second annular groove 461, so that the first end cover 46 is closely wrapped at the rear end portion 432b of the insulation frame 43, and further, the first end cover 46 seals the first end 341 of the first space 34. In this example, the first end cover 46 is made of a rubber material, so that a sealing effect can be further improved, thereby improving a dustproof effect of the motor 20.

In this example, the second end cover 35 is fixedly connected to the rotor shaft 31, and the second end cover 35 can synchronously rotate with the rotor shaft 31 by using the first axis 102 as an axis. An annular surface 351 is formed on the second end cover 35. The annular surface 351 extends in a plane perpendicular to the first axis 102. The second end cover 35 is disposed near the front end portion 432a of the insulation frame 43. The passage 36 in the present example is formed between the annular surface 351 and an end surface of the front end portion 432a. In this example, the passage 36 is a unique path that makes the first space 34 in communication with the second space 45.

Figure 11:
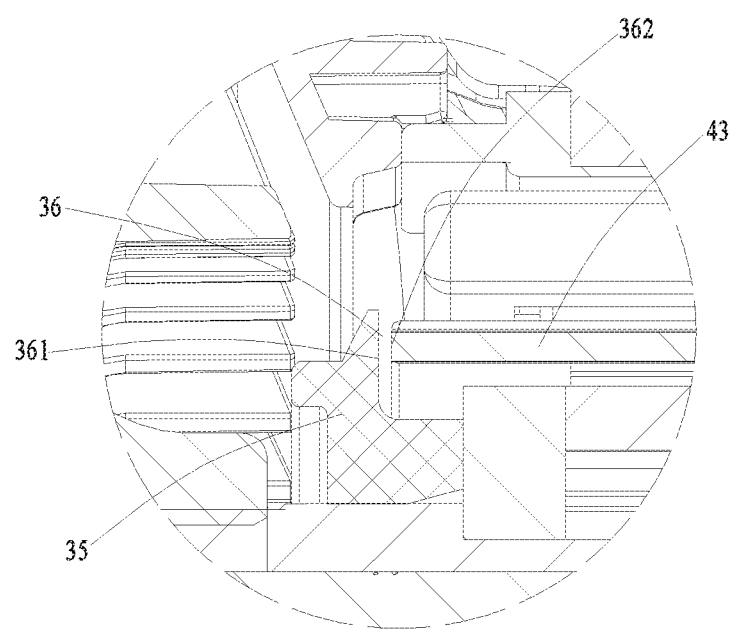
FIG. 11 is an enlarged view of a partial structure in FIG. 7.

As shown in FIG. 11, in a plane passing through the first axis 102, a section of the passage 36 in the plane includes a first section line 361 and a second section line 362. A distance between two points that are closest to each other in the first section line 361 and the second section line 362 is less than or equal to 5 mm, and further, the distance between the two points that are closest to each other in the first section line 361 and the second section line 362 is less than or equal to 2 mm. In this example, the passage 36 extends along the radial direction perpendicular to the first axis 102. Therefore, the first section line 361 and the second section line 362 are both straight lines and parallel to each other. A distance between the first section line 361 and the second section line 362 is less than or equal to 2 mm.

In this example, an air director 14 used to guide the heat dissipation airflow to the air outlet 114 is further disposed in the housing 11.

Figure 12:
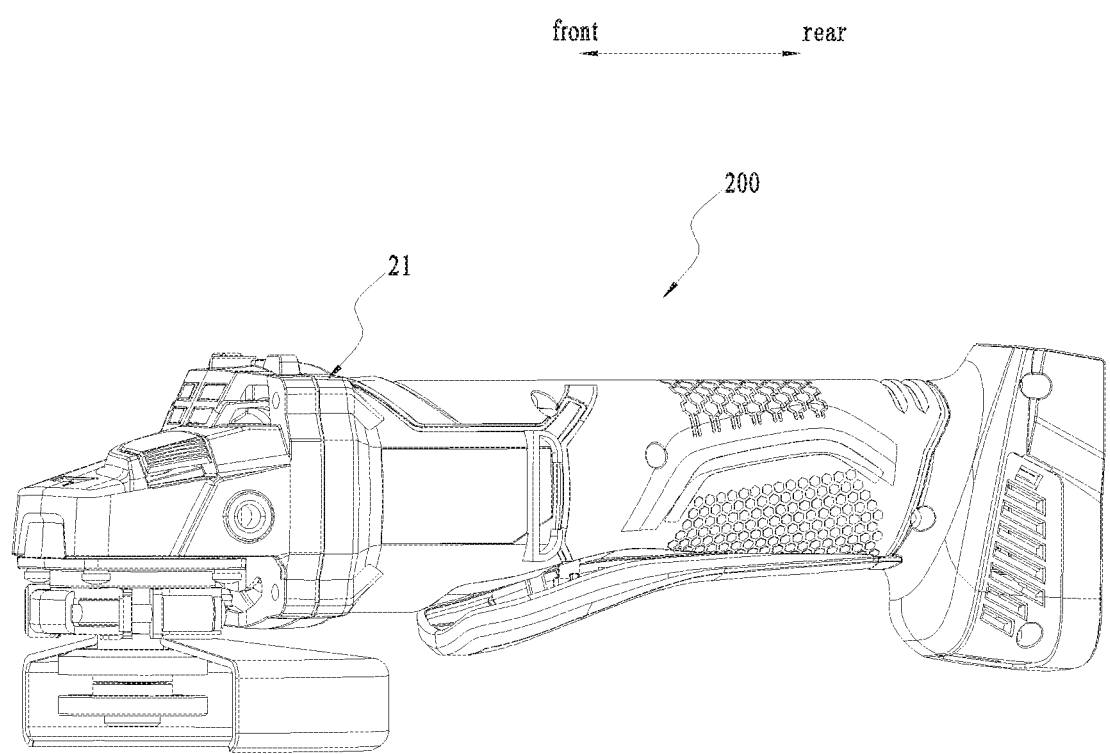
FIG. 12 is also a three-dimensional diagram of an example electric tool constructed according to the description that follows.
Figure 13:
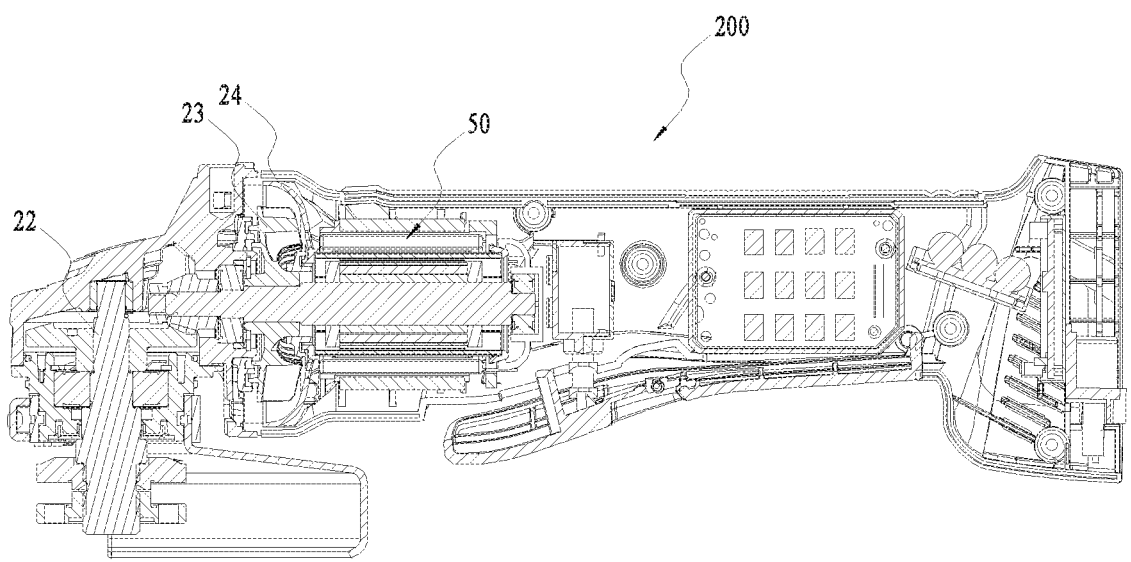
FIG. 13 is a sectional view of the electric tool in FIG. 12.
Figure 14:
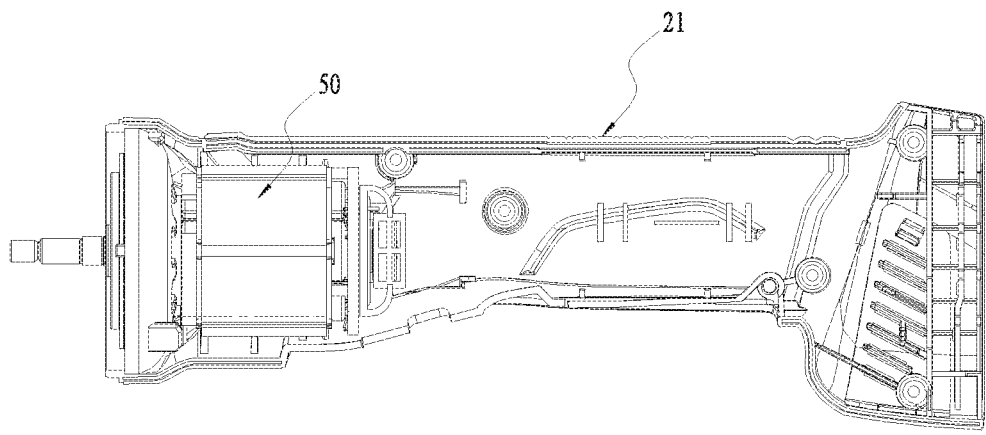
FIG. 14 is a plan view of a partial housing, a motor, a fan, and an air director of the electric tool in FIG. 12.
Figure 15:
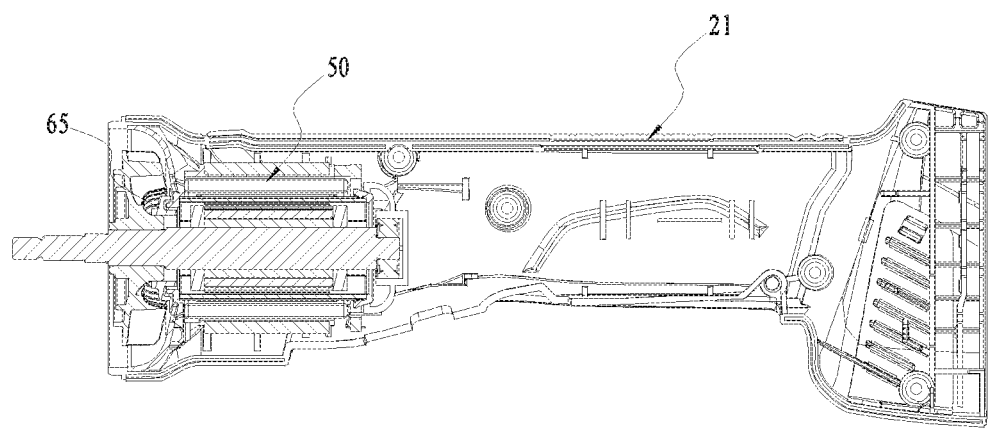
FIG. 15 is a sectional view of a structure shown in FIG. 14.
Figure 16:
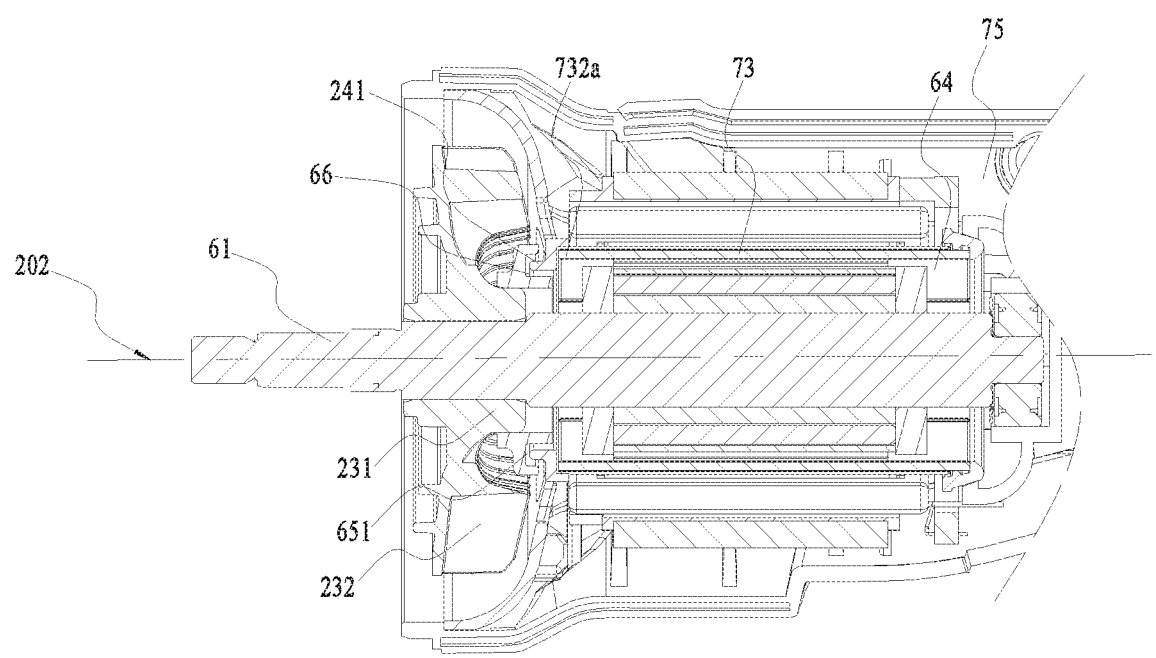
FIG. 16 is an enlarged view of a partial structure in FIG. 15.

An example electric tool 200 is also shown in FIG. 12 and FIG. 13 and has a housing 21, a motor 50, an output member 22, a fan 23, and an air director 24 that are the same as those in the electric tool 100. As shown in FIG. 13 to FIG. 17, a difference between this example tool 200 and example tool 100 only lies in that specific structures of a second end cover 65 and positions at which the second end cover 65 is disposed are different. Parts in the example tool 100 that are applicable to example tool 200 may all be applied to example tool 200.

Specifically, in this example, the fan 23 includes an installation portion 231 and a fan blade portion 232. The installation portion 231 is used to fix the fan 23 to a rotor shaft 61. The fan blade portion 232 extends outward from the installation portion 231. The second end cover 65 is fixedly connected to the installation portion 231 of the fan 23, so that the second end cover 65 and the fan 23 rotate with the rotor shaft 61.

The air director 24 is interconnected to a front end portion 732a of an insulation frame 73, so that a first space 64 is sealed relative to a second space 75 at a position at which the air director 24 is interconnected to the front end portion 732a. The air director 24 further includes an annular portion 241 around a first axis 202. A space formed by enclosing the first axis 202 by the annular portion 241 is interconnected to the first space 64, so that the first space 64 further extends along a direction of the first axis 202. That is, the space formed by enclosing the first axis 202 by the annular portion 241 is interconnected to the first space 64 to jointly form an annular space sealed relative to a second space 75 in a radial direction perpendicular to the first axis 202. An annular groove 651 is formed on the second end cover 65, and the annular groove 651 is disposed around the rotor shaft 61. The annular portion 241 is embedded into the annular groove 651, and the annular portion 241 is not in contact with a groove wall of the annular groove 651, so as to form a passage 66 that is used to uniquely make the first space 64 in communication with the second space 75. The passage 66 is further a gap formed between the second end cover 65 and an end surface of the annular portion 241. The annular portion 241 is in contact with neither the groove wall nor a groove bottom of the annular groove 651, so as to form a labyrinth passage 66 between the annular portion 241 and the annular groove 651.

Figure 17:
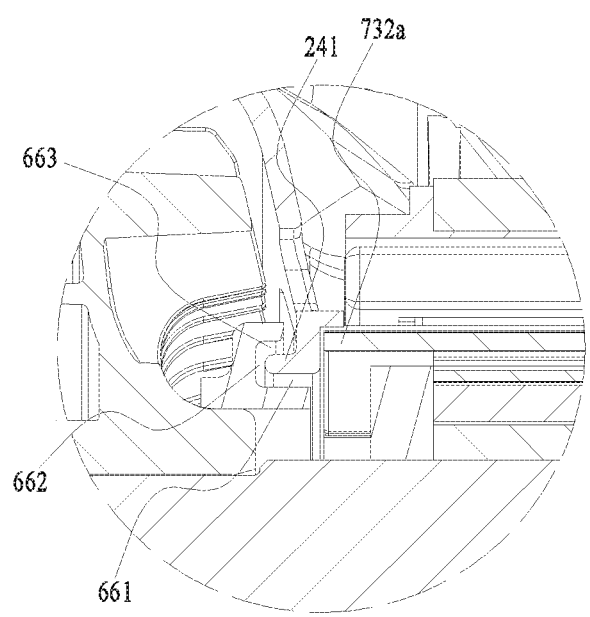
FIG. 17 is a further enlarged view of a partial structure in FIG. 16.

As shown in FIG. 17, in this example, in a plane passing through the first axis 202, a section of the passage 66 in the plane includes a first passage portion 661 that extends along a first line direction, a second passage portion 662, and a third passage portion 663. The first passage portion 661 extends along the first line direction. The second passage portion 662 extends along a second line direction. The third passage portion 663 extends along a third line direction. The first line direction in which a first passage 661 extends and the second line direction in which a second passage 662 extends intersect with each other and are perpendicular to each other. The first line direction in which the first passage 661 extends and the third line direction in which a third passage 663 extends are parallel to each other. In this example, the second passage portion 662 is the narrowest relative to the first passage portion 661 and the second passage portion 662. That is, a section of the second passage portion 662 in a plane perpendicular to a second straight line is less than a section of the first passage portion 661 in a plane perpendicular to a first straight line, and the section of the second passage portion 662 in the plane perpendicular to the second straight line is also less than a section of the third passage portion 663 in a plane perpendicular to a third straight line. Therefore, it may be considered that the second passage portion 662 in this example is a narrowest passage portion.

In this example, the fan 23 is directly connected to the rotor shaft 61. To better perform heat dissipation, the fan 23 is made of an aluminium material having a good heat conduction effect. In this way, heat in the first space 64 can be dissipated by using the rotor shaft 61 and the fan 23. Alternatively, in another example, another heat conduction medium may be disposed between the fan 23 and the rotor shaft 61. Similarly, heat in the first space 64 can be well dissipated.

In another example, the second end cover 65 may be further connected to a magnetic member. For an angle grinder, the magnetic member can adsorb metal dust, and after long-time working, the metal dust is adsorbed on the magnetic member to seal the passage 66, thereby achieving a relatively good dustproof effect.

Figure 18:
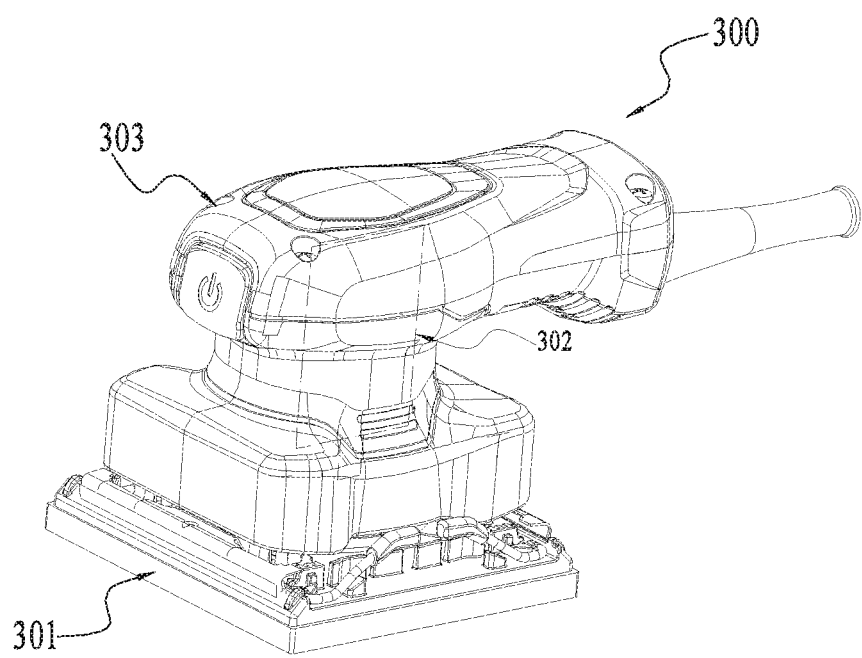
FIG. 18 is a further three-dimensional diagram of an example electric tool constructed according to the description that follows.

In FIG. 18, an electric tool is specifically a sander 300. The sander 300 includes an output member. The output member is specifically a baseboard 301 used to install sandpaper. The sander 300 further includes a motor 302 shown in a simplified diagram in FIG. 1. The motor 302 has a same structure as the motor 20 in the example tool 100. The motor 302 drives the baseboard 301 to move. The sander further includes a housing 303 used to accommodate the motor 302.

Basic principles, main features, and advantages of the subject electric tool are displayed and described above. A person skilled in the art should understand that, the foregoing examples are not intended to limit the invention that is hereinafter claimed in any form, and technical solutions obtained through equivalent replacement or equivalent variation all fall within the protection scope of the claims.

What is claimed is:
1. An electric tool, comprising:
 an output member for outputting power;
 a motor used to drive the output member to move to output power;

a fan fixedly connected to a rotor shaft, wherein when the fan rotates, a barometric pressure in a first space is less than a barometric pressure in a second space;
an air director comprising an annular portion around a first axis; and
a housing provided with an accommodation cavity used to accommodate the motor;
wherein the motor comprises:
the rotor shaft configured to rotate around the first axis;
a rotor core that synchronously rotates with the rotor shaft; and
a stator component comprising a stator core, a coil winding, and an insulation frame;
wherein the stator component surrounds the first axis to separate the accommodation cavity into the first space and the second space, the rotor core is disposed in the first space, the coil winding is disposed in the second space, and, along a direction of the first axis, the first space comprises a first end away from the output member and a second end close to the output member; and
wherein the motor further comprises:
a first end cover disposed at the first end of the first space to seal the first space at the first end of the first space; and
a second end cover, disposed at the second end of the first space, arranged to form a passage between the second end cover and a structure surrounding the first space with the passage being configured to place the first space into communication with the second space, and together, the stator core, the insulation frame, the first end cover, and the second end cover form the first space and the passage is located in the second end, and the second end cover and the air director are separately formed.

2. The electric tool according to claim 1, wherein the second end cover rotates with the rotor shaft.

3. The electric tool according to claim 1, wherein the passage comprises a narrowest passage portion having a smallest sectional area in a plane perpendicular to an extension direction of the passage, the first space extends along the direction of the first axis, and a sectional area of the narrowest passage portion is less than a largest sectional area of the first space in a plane perpendicular to the first axis.

4. The electric tool according to claim 1, wherein the stator component further comprises a stator core comprising a yoke portion and multiple tooth portions extending from the yoke portion, an insulation frame is at least partially disposed between the stator core and the coil winding, the insulation frame comprises a front end portion close to the output member and a rear end portion away from the output member, and the first end cover is connected to the rear end portion of the insulation frame.

5. The electric tool according to claim 4, wherein the insulation frame further comprises multiple enclosure portions that are spaced apart in a circumferential direction around the first axis, the enclosure portions form an opening used to make the tooth portion exposed, and the motor further comprises a spacer disposed between two adjacent enclosure portions.

6. The electric tool according to claim 4, wherein the passage is formed between the second end cover and an end surface of the front end portion.

7. The electric tool according to claim 1, wherein the second end cover is fixedly connected to the rotor shaft.

8. The electric tool according to claim 1, wherein the fan is fixedly connected to the rotor shaft and the second end cover is fixedly connected to the fan.

9. The electric tool according to claim 1, wherein the fan is fixedly connected to the rotor shaft and the fan is made of aluminum.

10. The electric tool according to claim 1, wherein the space enclosed by the annular portion and the first space combines into an annular space sealed relative to the second space in a radial direction perpendicular to the first axis, and the passage is formed between the second end cover and an end surf ace of the annular portion.

11. The electric tool according to claim 10, wherein an annular groove is formed on the second end cover, the annular portion is embedded into the annular groove, and there is a gap between the annular portion and a groove wall of the annular groove.

12. The electric tool according to claim 1, wherein the passage comprises a first passage portion extending along a first line direction, a second passage portion extending along a second line direction, and the first line direction intersects with the second line direction.

13. The electric tool according to claim 1, wherein the first end cover is made of a rubber material.

14. An angle grinder, comprising:
an output shaft used to install an abrasive disc;
a motor used to drive the output shaft to rotate;
a fan fixedly connected to a rotor shaft, wherein when the fan rotates, a barometric pressure in a first space is less than a barometric pressure in a second space;
an air director comprising an annular portion around a first axis; and
a housing provided with an accommodation cavity used to accommodate the motor;
wherein the motor comprises:
a rotor shaft configured to rotate around the first axis;
a rotor core synchronously rotating with the rotor shaft; and
a stator component comprising a stator core, a coil winding, and an insulation frame,
wherein the stator component surrounds the first axis to separate the accommodation cavity into a first space and a second space, the rotor core is disposed in the first space, the coil winding is disposed in the second space, and, along a direction of the first axis, the first space comprises a first end away from the output shaft and a second end close to the output shaft; and
wherein the motor further comprises:
a first end cover disposed at the first end of the first space, to seal the first space at the first end of the first space; and
a second end cover, disposed at the second end of the first space, arranged to form a passage between the second end cover and a structure surrounding the first space with the passage configured to place the first space into communication with the second space, the passage is located in the second end and together, the stator core, the insulation frame, the first end cover, and the second end cover form the first space.

15. The angle grinder according to claim 14, wherein a space enclosed by the annular portion and the first space combines into an annular space sealed relative to the second space in a radial direction perpendicular to the first axis, the passage is formed between the second end cover and an end surface of the annular portion, an annular groove is formed on the second end cover, the annular portion is embedded into the annular groove and there is a gap between the annular portion and a groove wall of the annular groove.

16. A sander, comprising:
a baseboard used to install sandpaper;
a motor used to drive the baseboard to move;
a fan;
an air director comprising an annular portion around a first axis; and
a housing provided with an accommodation cavity used to accommodate the motor;
wherein the motor comprises:
a rotor shaft configured to rotate around the first axis;
a rotor core synchronously rotating with the rotor shaft; and
a stator component comprising a stator core, a coil winding, and an insulation frame;
wherein the fan is fixedly connected to the rotor shaft and when the fan rotates, a barometric pressure in a first space is less than a barometric pressure in a second space
wherein the stator component surrounds the first axis to separate the accommodation cavity into the first space and the second space, the rotor core is disposed in the first space, the coil winding is disposed in the second space, and along a direction of the first axis, the first space comprises a first end away from the baseboard and a second end close to the baseboard; and
the motor further comprises:
a first end cover disposed at the first end of the first space, to seal the first space at the first end of the first space; and
a second end cover, disposed at the second end of the first space, arranged to form a passage between the second end cover and a structure surrounding the first space with the passage is located in the second end and is configured to place the first space into communication with the second space and together, the stator core, the insulation frame, the first end cover, and the second end cover form the first space.

* * * * *